(12) United States Patent
Ridley et al.

(10) Patent No.: US 12,366,894 B2
(45) Date of Patent: Jul. 22, 2025

(54) ELECTRONIC DEVICE AND METHOD OF CONVERTING AUDIO TO LIGHT EFFECT THEREOF

(71) Applicant: Nothing Technology Limited, London (GB)

(72) Inventors: Thomas Douglas Ridley, London (GB); Raymond Zhu, London (GB); Qi Xu, Shenzhen (CN)

(73) Assignee: Nothing Technology Limited, London (GB)

( * ) Notice: Subject to any disclaimer, the term of this patent is extended or adjusted under 35 U.S.C. 154(b) by 292 days.

(21) Appl. No.: 18/345,945

(22) Filed: Jun. 30, 2023

(65) Prior Publication Data

US 2024/0004434 A1    Jan. 4, 2024

(30) Foreign Application Priority Data

Jun. 30, 2022    (CN) .......................... 202210764543.5

(51) Int. Cl.
| | |
|---|---|
| G06F 1/16 | (2006.01) |
| F21V 33/00 | (2006.01) |
| H05B 47/105 | (2020.01) |
| H05B 47/155 | (2020.01) |
| H05B 47/165 | (2020.01) |
| F21S 4/00 | (2016.01) |

(52) U.S. Cl.
CPC ........ *G06F 1/1656* (2013.01); *F21V 33/0052* (2013.01); *H05B 47/105* (2020.01); *H05B 47/155* (2020.01); *H05B 47/165* (2020.01); *F21S 4/00* (2013.01)

(58) Field of Classification Search
CPC ..... G06F 1/656; H05B 47/155; H05B 47/165; H05B 47/105; F21V 33/0052; G21S 4/00
See application file for complete search history.

(56) References Cited

U.S. PATENT DOCUMENTS

| | | | | | |
|---|---|---|---|---|---|
| 5,056,399 | A  | * | 10/1991 | Hornstein | A63J 17/00 340/815.45 |
| 6,342,663 | B1 | * | 1/2002 | Kato | G09B 15/023 84/478 |
| 10,010,806 | B2 | * | 7/2018 | Lee | H05B 45/20 |
| 12,317,388 | B1 | * | 5/2025 | Dhanapalan | H05B 47/155 |
| 2005/0217457 | A1 | * | 10/2005 | Yamamoto | A63J 17/00 84/464 R |
| 2005/0275626 | A1 | * | 12/2005 | Mueller | H05B 47/19 345/156 |
| 2007/0008711 | A1 | * | 1/2007 | Kim | A63J 17/00 362/86 |

(Continued)

FOREIGN PATENT DOCUMENTS

WO    2021186420 A1    9/2021

OTHER PUBLICATIONS

European Search Report from Application No. 23182280.0 dated Oct. 31, 2023.

*Primary Examiner* — Robert W Horn
(74) *Attorney, Agent, or Firm* — Calfee, Halter & Griswold LLP

(57) ABSTRACT

An electronic device of converting audio to light effect includes a main body, light strips located on a back surface of the main body, and a transparent back cover; and an audio playing unit. The transparent back cover overall covers the back surface of the main body having the light strips.

20 Claims, 3 Drawing Sheets

(56) References Cited

U.S. PATENT DOCUMENTS

| | | | |
|---|---|---|---|
| 2017/0340984 A1* | 11/2017 | Lee | H05B 47/155 |
| 2023/0247744 A1* | 8/2023 | Tellatin | H05B 47/12 |
| | | | 315/76 |
| 2024/0004434 A1* | 1/2024 | Ridley | G06F 1/1656 |

* cited by examiner

ELECTRONIC DEVICE AND METHOD OF CONVERTING AUDIO TO LIGHT EFFECT THEREOF

CROSS-REFERENCE TO RELATED APPLICATIONS

This application claims priority benefits to Chinese Patent Application No. 202210764543.5, filed Jun. 30, 2022, the contents of which are incorporated herein by reference.

TECHNICAL FIELD

The present disclosure relates to fields of electronic devices, and in particular to an electronic device and a method of converting audio to light effect thereof.

BACKGROUND

In the last decade or so, with the rapid development of science and technology, there have been many examples of technology changing lives. In other words, because of the rapid development of science and technology, consumers are not only demanding more from electronic products in terms of functionality, but also in terms of their aesthetic appearance. In an increasingly competitive product market, products which are aesthetically pleasing and more recognisable are more likely to be favoured by consumers. However, the current consumer electronic products have a convergence effect in terms of appearance, and some electronic products are even difficult to distinguish from the appearance of which brand and which series of products they belong to, bringing aesthetic fatigue to consumers.

SUMMARY

In a first aspect, the present disclosure provides a method of converting audio to light effect, applied to an electronic device. The electronic device includes a main body. The electronic device further include light strips located on a back surface of the main body, and a transparent back cover. The transparent back cover overall covers the back surface of the main body having the light strips. The electronic device further includes an audio playing unit. The method includes steps as follows.

An audio file is obtained in real time.

Light effect control instructions corresponding to the audio file are obtained based on the audio file. The light effect control instructions are a plurality of control instructions which control the light strips to be lit up in a lighting manner matching playback parameters of the audio file. The lighting manner includes one or more of a lighting area, a lighting colour, a lighting frequency, a lighting duration, and a number of light flashes.

A light effect consistent with the playback parameters of the audio file is created by controlling the audio playing unit play the audio file, and synchronously controlling the light strips to light up in accordance with the lighting manner in response to the light effect control instructions.

In a second aspect, the present disclosure provides an electronic device. The electronic device includes a main body. The electronic device further includes light strips located on a back surface of the main body, and a transparent back cover. The transparent back cover overall covers the back surface of the main body having the light strips. The electronic device further includes an audio playing unit. The electronic device further includes a processor and a memory. The memory stores computer program, and the processor runs the computer program to execute the method of converting audio to light effect as mentioned in the first aspect.

BRIEF DESCRIPTION OF THE ACCOMPANYING DRAWINGS

DETAILED DESCRIPTION OF ILLUSTRATED EMBODIMENTS

Embodiments of the present disclosure are described in detail below and examples of the embodiments are shown in the accompanying drawings. The same or similar designations from beginning to end indicate the same or similar components or components having the same or similar functions. The embodiments described below with reference to the accompanying drawings are exemplary and are intended to explain the present disclosure and are not to be construed as a limit of the present disclosure.

Furthermore, the terms "first", "second" are used for descriptive purposes only and are not to be understood as indicating or implying relative importance or as implicitly specifying the number of technical features indicated. Thus, a feature qualified with "first", "second" may explicitly or implicitly include one or more such features. In the description of the present disclosure, "plurality" means two or more, unless otherwise expressly and specifically limited.

In the present disclosure, unless expressly specified and limited, terms such as "connect" and "fixed" should be interpreted in a broad sense. For example, they can be fixed connections, detachable connections, or integrated structures; they can be mechanical connections, electrical connections; they can be directly connected or indirectly connected via intermediaries, and can be internal connections or interaction relationships between two components. For ordinary persons skilled in the art, the specific meanings of the above terms in the present disclosure can be understood according to specific circumstances.

Figure 1:
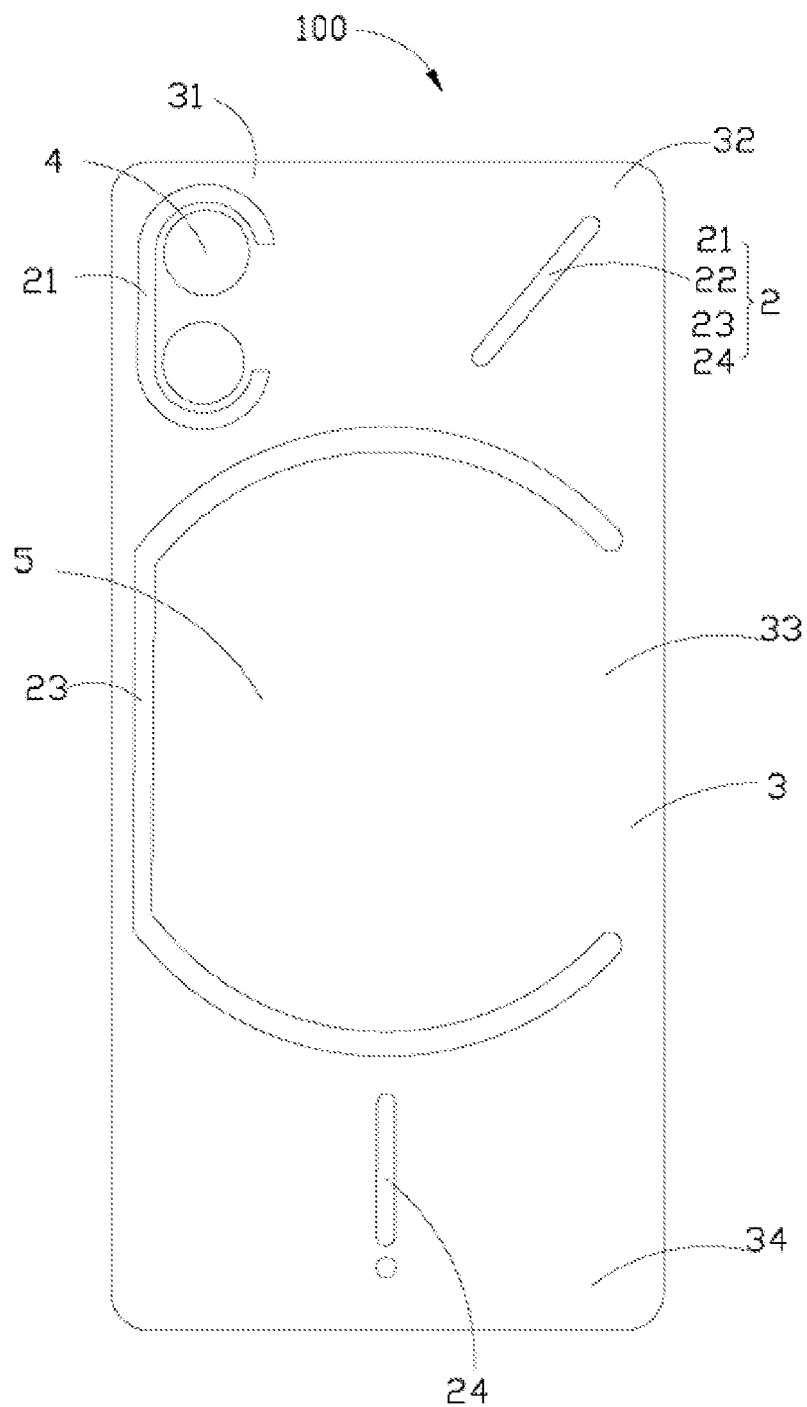
FIG. 1 shows a structural schematic diagram of an electronic device in accordance with one embodiment of the present disclosure.
Figure 2:
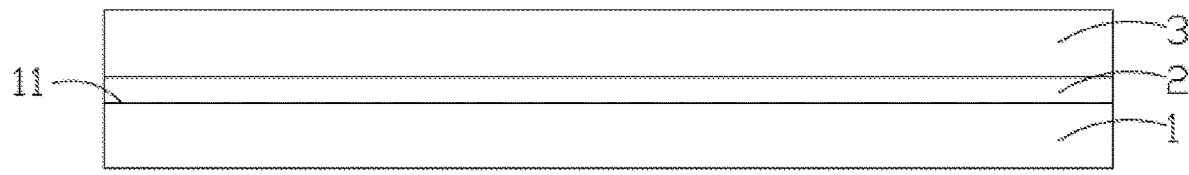
FIG. 2 shows a cross-sectional diagram of the electronic device in accordance with one embodiment of the present disclosure.

Referring to FIGS. 1 and 2, FIG. 1 shows a structural schematic diagram of an electronic device in accordance with one embodiment of the present disclosure; FIG. 2 shows a cross-sectional diagram of the electronic device in accordance with one embodiment of the present disclosure. The electronic device 100 can include a main body 1. The electronic device 100 can further include light strips 2 located on a back surface 11 of the main body 1 and a transparent back cover 3. The transparent back cover 3 overall covers the back surface 11 of the main body 1 having the light strips 2. The transparent back cover 3 is capable of transmitting the light emitted by the light strips 2. In detail, in this embodiment, the main body 1 can further include a rear camera 4 and a rear wireless charging zone 5. The wireless charging zone 5 is electrically coupled to a battery of the electronic device 100. The wireless charging zone 5 is used for charging or discharging in coupling with an external wireless charging device. Optionally, the back surface 11 of the main body 1 is divided into four zones, namely a first zone 31 and a second zone 32 arranged side by side at a top end of the transparent back cover 3, a third zone 33 located in a middle portion of the transparent back cover 3, and a fourth zone 34 located at a bottom end of the transparent back cover 3. The top end, middle portion, and bottom end refer to the top end, middle portion, and bottom end of the electronic device 100 when it is in a vertical screen use state. The rear camera 4 is located in the first zone 31. The wireless charging zone 5 is located in the third zone 33. The light strips 2 can include a first light strip 21, a second light strip 22, a third light strip 23, and a fourth light strip 24. The first light strip 21 is roughly C-shaped and is located in the first zone 31, surrounding the rear camera 4 of the electronic device 100. The second light strip 22 is roughly inclined from top to bottom and is located in the second zone 32. The third light strip 23 is roughly C-shaped and is located in the third zone 33, surrounding the wireless charging zone 5. The second light strip 22 and the third light strip 23 can form a roughly lollipop shape. The fourth light strip 24 is roughly in an "!" shape and is located in the fourth zone 34. In other embodiments, it should be understood that the number, the shape, and the placement of the light strips 2 are not limited to the description of the above embodiment and may be changed as needed.

Figure 3:
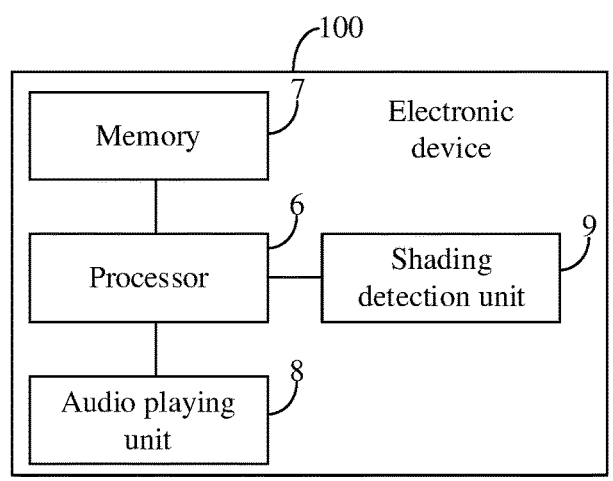
FIG. 3 shows a module diagram of the electronic device in accordance with one embodiment of the present disclosure.

Referring to FIG. 3, FIG. 3 shows a module diagram of the electronic device in accordance with one embodiment of the present disclosure. The electronic device 100 can further include a processor 6, a memory 7 and an audio playing unit 8. The memory 7 and the audio playing unit 8 are electrically connected to the processor 6, respectively. The memory 7 stores a computer program. The processor 6 runs the computer program and executes the method of converting audio to light effect. The storage 7 also stores relevant data for executing the method of converting audio to light effect.

In detail, the processor 6 runs the computer program to execute as follows.

An audio file is obtained in real time.

Light effect control instructions corresponding to the audio file are obtained based on the audio file. The light effect control instructions includes a plurality of control instructions which control the light strips to be lit up in a lighting manner matching playback parameters of the audio file. The lighting manner includes one or more of a lighting area, a lighting colour, a lighting frequency, a lighting duration, and a number of light flashes.

A light effect consistent with the playback parameters of the audio file is created by controlling the audio playing unit 8 to play the audio file, and synchronously controlling the light strips 2 to light up in accordance with the lighting manner in response to the light effect control instructions.

In the present disclosure, while an audio file is obtained and the audio playing unit 8 is controlled to play the audio file, the light strips 2 located on the back surface of the electronic device 100 are synchronously controlled to light up according to the lighting manner of the light effect control instructions, forming a lighting effect consistent with the playback parameters of the audio file. This allows the electronic device 100 to have corresponding light effects while playing audio, bringing a better user experience.

The playback parameters can include at least one of playback volume, playback rhythm, playback speed, etc.

The audio file comes from a wide range of sources. In one embodiment, the audio file is a system pre-stored audio file. The system pre-stored audio file can be, but is not limited to, one or more of system pre-stored ringtone files, music files, audio files, videos files containing audio, etc. The system has pre-stored light effect control instructions, and the pre-stored light effect control instructions match the system pre-stored audio file. Therefore, when the processor 6 obtains this type of audio file, it does not need to perform data processing and analysis, but rather obtains the corresponding light effect control instructions directly from the system. It should be understood that the system pre-storage can be stored in the memory 7 and/or on cloud storage devices, etc. Thereby, when the electronic device 100 obtains the system pre-stored audio file, it can obtain the light effect control instructions directly from the system based on the system pre-stored audio file, reducing the amount of data processing and accelerating the system response speed to bring convenience to users.

The system pre-stored can be stored in the memory 7 before leaving the factory, or pre-stored in an application related to converting audio to light effect, which can be downloaded from an application download platform after leaving the factory However, in the Big Data Era, there are very many types of audio files. Suppliers cannot pre-analyze and generate corresponding light effect control instructions for all the audio files. Therefore, if the processor 6 itself does not have the analytical and generating capabilities for these light effect control instructions, it will greatly reduce the application scope of obtaining corresponding light effects using the light strips 2. Therefore, in the present disclosure, the processor 6 can perform spectrum analysis on the audio file to obtain the spectrum of the audio file, and determine the light effect control instructions corresponding to the spectrum in accordance with the spectrum of the audio file.

Therefore, even though the audio file obtained by the processor 6 is not the system pre-stored audio file, the processor 6 can perform spectrum analysis on the audio file to obtain the spectrum of the audio file, and determine the light effect control instructions corresponding to the spectrum in accordance with the spectrum of the audio file, thus greatly expanding the application range for obtaining the corresponding light effects by using the light strips 2.

Optionally, in at least one embodiment, when the audio file is a conventional audio file and not a system pre-stored audio file and there are no light effect control instructions matching the conventional audio file pre-stored in the system, the processor 6 generates light effect control instructions corresponding to the spectrum of the audio file according to the spectrum of the audio file, in accordance with an audio-light effect conversion algorithm.

The audio-light effect conversion algorithm is one of conventional audio-light effect conversion algorithms. The processor 6 obtaining light effect control instructions corresponding to the audio file according to the audio file, includes: determining a category of usage environment of the audio file; obtaining light effect control instructions corresponding to the category of the usage environment of the audio file based on the difference of the usage environment of the audio file.

It can be understood that some basic parameter values in the audio-light effect conversion algorithm are not set changeless, and different audio light effect conversion algorithms can also be selected according to the usage environment or the source of the audio file. Here, the category of the usage environment of the audio file and the source of the audio file can be pre-set by the system or set by the user. For example, different light effect control instructions can be generated by changing some basic parameter values in the audio light effect conversion algorithm or by directly changing the audio light effect conversion algorithm when used in different environments such as a conference room, at home, outdoors, in a cinema, during the day, at night, etc. With regard to the source of the audio file, e.g. when the voice or video file is from a key contact, different light effect control instructions can be generated in accordance with the reminder ringtone by changing some basic parameter values in the audio light effect conversion algorithm or by directly changing the audio light effect conversion algorithm, which causes the light effect of the reminder ringtone for the key contact to be made different from a reminder way of the light effect of the regular contact. For example, for alarm clock ringtone, it is possible to set a focused alarm clock, e.g. a wake up alarm clock ringtone, different light effect control instructions can be generated in accordance with the wake up alarm clock ringtone by changing some basic parameter values in the audio light effect conversion algorithm or by directly changing the audio light effect conversion algorithm, which causes the light effect of the reminder ringtone for the wake up alarm clock to be different from a reminder way of the light effect of the conventional alarm clock.

The conventional audio file can be one or more of ringtone files, music files, audio files, videos files containing audio, an instant voice, a voice in an instant video. The ringtone file may be, but is not limited to, a telephone ringtone file, an SMS ringtone file, an alarm clock ringtone file, and other reminder ringtones, etc. The music file may be a music file downloaded locally from the internet, and may also be a music file obtained from the internet by a music application. The audio file is a file containing audio and/or voice, for example, a voice file in a live chat application, etc. The video file is a video file containing audio, for example, various types of video files, such as a short video on the web (e.g., a short video in an application such as Shake, Racer, Watermelon Video, etc.), a short video in a live chat application, a movie file, a TV series file, etc. The voice file is a piece of voice. The instant voice includes an audio file generated in a scenario such as being on a phone call or being in a voice chat. The voice in an instant video recording includes an audio file generated in a scenario such as live streaming or being in a video chat, for example, an audio file generated in real time during a live stream or video chat. The above is not a limitation, but rather an example.

Thus, the above-mentioned types of conventional audio files can be divided into four main types, namely ringtone files, music files, audio/video files, and instant voice/video call files.

The lighting manner is a combination of one or more of a lighting area, a lighting colour and a lighting frequency.

When the lighting manner includes the lighting area, the processor 6 may be used to select a different lighting area according to a type of audio file. For example, when playing a ringtone file, the first light strip 21 is controlled to work for the light effect. During a voice/video call, the fourth light strip 24 is controlled to work for the light effect in accordance with a first audio signal obtained in real time by an audio collection unit of the electronic device 100. The second light strip 22 is controlled to work for the light effect in accordance with the second audio signal played in real time by a receiver unit of the electronic device 100. The first light strip 21, the second light strip 22, the third light strip 22 and the fourth light strip 24 are controlled to work together to achieve the light effect when playing music files/audio files/video files. It can be understood that the above are examples only and are intended to illustrate the application more clearly and not to limit it. It can be understood that in another embodiment, the processor 6 may select at least two different lighting areas to work to achieve the light effect according to the type of audio file. For example, the first light strip 21 and the second light strip 22 are controlled to achieve the light effect when playing a ringtone file; the second light strip 22 and the third light strip 23 are controlled to achieve the light effect when playing a music/audio files/video file. It can be understood that the above are examples only, to illustrate the application more clearly and not to limit it.

Thereby, for different types of audio files, the light strips located in different areas (the first light strip 21, the second light strip 22, the third light strip 23 or the fourth light strip 24) will be selected to work to present different light effects. Alternatively, the light strips located in at least two different areas (the first light strip 21, the second light strip 22, the third light strip 23 or the fourth light strip 24) are selected to work to present different light effects. This means that the type of the audio file can be differentiated according to the area where the light effect is produced. This makes it easier for the user to identify the type of audio file and also allows for the individual presentation of the light effects of the audio file.

Of course, in another embodiment, the processor 6 also selects, according to the type of audio file, the light strips in at least two zones (the first light strip 21, the second light strip 22, the third light strip 23 and/or the fourth light strip 24) to work. The light strips within the at least two regions can also be controlled to work alternately to present an alternative light effect.

For example, when the processor 6 controls the audio playing unit 8 to play a music file, the processor 6 controls the first light strip 21 to play a first chorus part, controls the second light strip 22 and the third light strip 23 to play a verse part, and controls the fourth light strip 24 to play the final chorus part.

When the lighting manner includes a lighting area and a lighting colour, the processor 6 is used to obtain the volume value of the audio file and to select a different lighting colour based on the difference in the volume value of the audio file. For example, when the current audio file is a music file and the volume value of the music file is lower than a first preset value, the processor 6 selects the corresponding lighting area to be first light strip 21 and controls the first light strip 21 to display green. When the current audio file is a music file and the volume value of the music file is higher than the first preset value and lower than a second preset value, the processor 6 selects the corresponding lighted area to be first light strip 21 and controls the first light strip 21 to display yellow. When the current audio file is a music file and the volume value of the music file is higher than the second preset value, the processor 6 selects the corresponding lighted area to be first light strip 21 and controls the first light strip 21 to display red. It should be understood that the above are examples only and are intended to illustrate the present disclosure more clearly and not to limit it. The first preset value is less than the second preset value. For example, the first preset value is 30 db and the second preset value is 50 db.

When the lighting manner includes a lighting area and a lighting frequency. The processor 6 is used to obtain the volume value of the audio file, and to select light-up or light-down based on the magnitude of the volume value of the audio file. For example, when the current audio file is a music file and the volume value of the music file is lower than a third preset value, the processor 6 selects the corresponding light area to be the first light strip 21 and controls the first light strip 21 to turn off the light. When the current audio file is a music file and the volume value of the music file is higher than a fourth preset value, the processor 6 selects the corresponding light area to be first light strip 21 and controls the first light strip 21 to turn on the light. This results in a flashing light effect when the lights are alternately switched on and off. It should be understood that the above are examples only and are intended to illustrate the present disclosure more clearly and not to limit it. For example, the third preset value is 20 db. It should be understood that when the lighting manner includes not only the lighting area and the lighting frequency but also the lighting colour, not only a flashing light effect but also a colour light effect will be created when the volume value of the audio file is greater than the first preset value.

It should be understood that in one embodiment, the spectrum of the audio file has a correspondence with the lighting frequency, i.e. it is also possible to match the lighting frequency to the spectrum of the audio file.

In some embodiments, when the audio playing unit 8 plays the audio file with different sound effects, the light strips 2 are presented with different light effects. The sound effects may be, but are not limited to, 3D li-vox, subwoofer, HIFI live, space sound, concert, acoustic vintage, pure vocals, 5.1 panorama, 3D rotation, vinyl record, reggae electro, generic car sound, unicorn sound, etc. Since under different sound effects, the sound effects attached to the audio playing unit 8 when playing the audio file are different, the processor 6, according to different sound effects of the audio playing unit 8 playing the audio file, uses different audio light effect conversion algorithms to generate different light effect control instructions.

For example, in one scenario, the electronic device 100 receives a new incoming call, the telephone ringtone preset for the new incoming call is a system pre-stored audio file. At this time, the processor 6 obtains the light effect control instructions corresponding to the telephone ringtone, and, while controlling the audio playing unit 8 to play the telephone ringtone, the processor 6 controls the first light strip 21 to light up in accordance with the light effect control instructions, so that the light effect presented by the light strips 2 is consistent with the rhythm of the ringing tone played by the audio playing unit 8, which serves as a double reminder and an effect of enhancing the atmosphere.

For example, in another scenario, when the processor 6 controls the audio playing unit 8 to play a music file, since the music file is not a pre-stored system file, the processor 6 first generates corresponding light effect control instructions based on the music file using the audio light effect conversion algorithm, and then controls the audio playing unit 8 to play the music file, simultaneously controls the first light strip 21 to present the corresponding light effect.

For example, in yet another of these scenarios, in a voice/video call scenario, the processor 6 determines whether it currently performs a human-computer dialogue in a voice input/output scenario. When it is determined in a voice input/output scenario, the processor 6 obtains the first audio signal collected by the audio collection unit in real time and the second audio signal played by the receiver unit. The processor controls the fourth light strip 24 to present the corresponding light effect in accordance with the first audio signal and controls the second light strip 22 to present the corresponding light effect in accordance with the second audio signal. The processor 6 controlling the fourth light strip 24 to present the corresponding light effect in accordance with the first audio signal and controlling the second light strip 22 to present the corresponding light effect in accordance with the second audio signal, includes: the processor 6 obtaining the volume of the first audio signal and controlling the fourth light strip 24 to light up or light down so as to present a corresponding light effect in accordance with the volume of the first audio signal, and obtaining the volume of the second audio signal and controlling the second light strip 22 to light up or light down so as to present a corresponding light effect in accordance with the volume of the second audio signal.

Optionally, in one embodiment, the electronic device 100 further includes a shading detection unit 9. The shading detection unit 9 is located at a corresponding position on the back surface 11 of the main body 1 and is electrically connected to the processor 6. The shading detection unit 9 generates a shading sensing signal when its ambient light is below a predetermined threshold. It should be understood that the shading detection unit 9 may be, but is not limited to, a light sensor, a camera, etc. The processor 6 determines, in response to the shading sensing signal, whether a transparent area of the transparent back cover 3 is shaded; when it determines that the transparent area of the transparent back cover 3 is not shaded, the processor 6, in response to the light effect control instructions, controls the light strips 2 to light up in accordance with the lighting manner to create a lighting effect consistent with the rhythm of the audio file.

It should be understood that the determination of whether the light is shaded or not may be that the transparent area of the transparent back cover 3 is not shaded at all or that the area of the transparent area of the transparent back cover 3 is shaded is less than a predetermined value.

It should be understood that in other embodiments, the processor 6 further determines whether to control the light strips 2 to produce a light effect based on whether the back surface 11 of the electronic device 100 is facing upwards. Specifically, the processor 6 controls the light strips 2 to produce a light effect when the back surface 11 of the electronic device 100 faces upwards. The processor 6 does not control the light strips 2 to produce the light effect when the back surface 11 of the electronic device 100 faces downwards. The processor 6 may detect whether the back surface 11 of the electronic device 100 is facing up or down by means of a gyroscope. Specifically, the processor 6 may detect whether the back surface 11 of the electronic device 100 is facing up or down based on a positive or negative Z-axis data of the gyroscope. In some embodiments, when the processor 6 detects the back surface 11 of the electronic device 100 to be facing downwards by a gyroscope, it further detects whether the electronic device 100 is horizontally placed by means of the gyroscope. Only if the electronic device 100 is horizontally positioned, the light strips 2 are not controlled to produce the light effect. The processor 6 may determine whether the electronic device 100 is horizontally positioned by means of the X-axis and Y-axis data of the gyroscope.

Thereby, the processor 6 controls the light strips 2 to produce the light effect only when the transparent area of the transparent back cover 3 is not shaded and/or the back surface 11 of the electronic device 100 is facing upwards. Of course, when the transparent area of the transparent back cover 3 is shaded and/or the back surface 11 of the electronic device 100 is facing downwards, the processor 6 does not control the light strips 2 to produce the light effect, so that excessive power consumption can be avoided.

Optionally, in one embodiment, the processor 6 determines, before controlling the light strips 2 to light up in response to the light effect control instructions, whether to obtain a light effect enabled instruction before playing the audio file or during playing the audio file. Only when the light effect enabled instruction is obtained, the processor 6 controls the light strips 2 to light up in response to the light effect control instructions. It should be understood that the light effect enabled instruction may be, but are not limited to, voice instructions, manually entered control instructions, a flip operation by the user to flip the electronic device 100, etc. For example, the user's voice says: please turn on the light effect, or, for example, during playing an audio file, the user flips the electronic device 100, and when the gyroscope of the electronic device 100 detects the flip angle of the electronic device 100 to be greater than a preset angle threshold, the light effect enabled instruction is generated.

Thereby, if each audio file is played with a corresponding light effect, it will greatly increase the power consumption of the electronic device 100, resulting in a shortening of the endurance of the electronic device 100 and affecting the user experience. Therefore, in practical application, the light strips 2 will only be lit up in response to the light effect control instructions when light effect enabled instruction is received, so as to reduce unnecessary lighting and power consumption, which not only meets the user's demand for light effects, but also saves electricity.

Optionally, in one embodiment, the processor 6, after controlling the light strips 2 to light up in accordance with the light effect control instructions, also determines whether a light effect closed instruction is obtained; when the light effect closed instruction is obtained, the light strips 2 are controlled to turn off the light effect. It should be understood that the light effect closed instruction may be, but is not limited to, voice instructions, manually entered control instructions, a flip operation by the user to flip the electronic device 100, etc. For example, the user's voice says: please turn off the light effect, or, for example, during playing an audio file, the user flips the phone again and when the gyroscope of the electronic device 100 detects the flip angle of the electronic device 100 to be greater than the preset angle threshold, the light effect closed instruction is generated.

Figure 4:
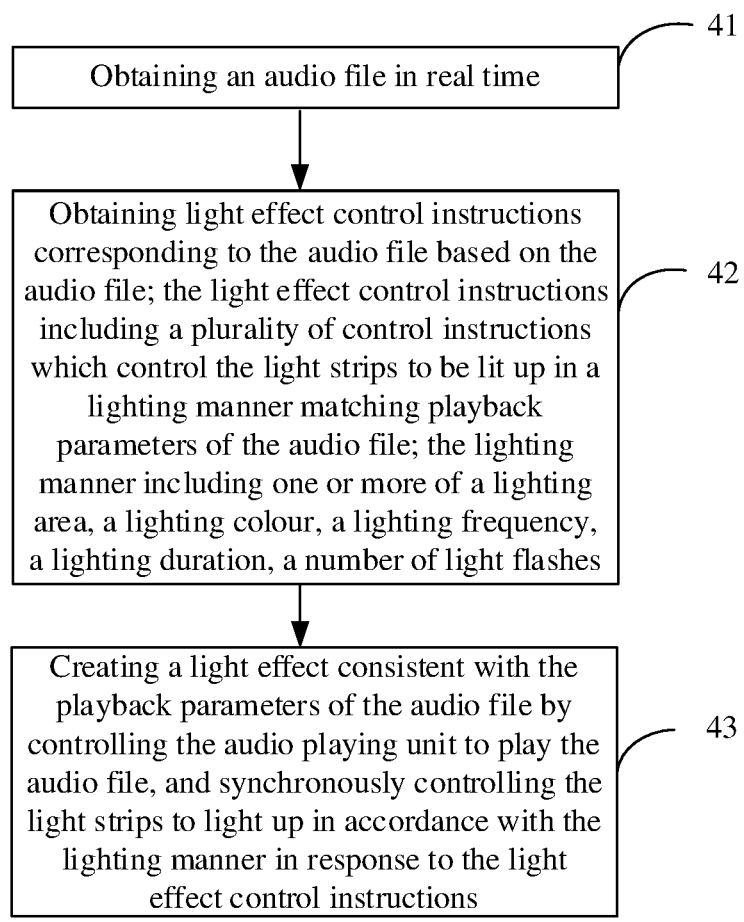
FIG. 4 is a flowchart of a method of converting audio to light effect in accordance with one embodiment of the present disclosure.

Referring to FIG. 4, FIG. 4 is a flowchart of a method of converting audio to light effect in accordance with one embodiment of the present disclosure. It should be understood that the order of the steps of the method can be adjusted according to practical needs. The method includes following steps.

Block 41: an audio file is obtained in real time.

Block 42: light effect control instructions corresponding to the audio file are obtained based on the audio file. The light effect control instructions includes a plurality of control instructions which control the light strips 2 to be lit up in a lighting manner matching playback parameters of the audio file. The lighting manner includes one or more of a lighting area, a lighting colour, a lighting frequency, a lighting duration, and a number of light flashes. Block 43: the audio playing unit 8 is controlled to play the audio file, and the light strips 2 are synchronously controlled to light up in accordance with the lighting manner in response to the light effect control instructions, so as to create a light effect consistent with the playback parameters of the audio file.

In the present disclosure, while an audio file is obtained and the audio playing unit 8 is controlled to play the audio file, the light strips 2 located on the back surface of the electronic device 100 are synchronously controlled to light up according to the lighting manner of the light effect control instructions, forming a lighting effect consistent with the playback parameters of the audio file. This allows the electronic device 100 to have corresponding light effects while playing audio, bringing a better user experience.

The audio file comes from a wide range of sources. In one embodiment, the audio file is a system pre-stored audio file. For example, the system pre-stored audio file can be system pre-stored ringtone files or music files. The system has pre-stored light effect control instructions, and the pre-stored light effect control instructions match the system pre-stored audio file. Therefore, when this type of audio file is obtained, it does not need to perform data processing and analysis, but rather obtains the corresponding light effect control instructions directly from the system. Obtaining light effect control instructions corresponding to the audio file based on the audio file, includes: obtaining light effect control instructions corresponding to the audio file based on the audio file from the system.

Therefore, when the electronic device 100 obtains the system pre-stored audio file, the light effect control instructions are obtained based on the system pre-stored audio file from the system, which reduces the data calculation load of the electronic device 100, speeds up the system response time, and provides convenience for the user.

The system pre-stored audio file can include, but is not limited to, one or more of a ringtone file, a music file, an audio file, a video file containing audio. It can be understood that the system pre-stored can be stored in the memory 7 before leaving the factory, or pre-stored in an application related to converting audio to light effect, which can be downloaded from an application download platform after leaving the factory The lighting manner can be one or more of lighting area, lighting colour, and lighting frequency.

Optionally, in one embodiment, obtaining light effect control instructions corresponding to the audio file based on the audio file, includes: performing spectrum analysis on the audio file to obtain the spectrum of the audio file, and determining the light effect control instructions corresponding to the spectrum in accordance with the spectrum of the audio file.

Therefore, even though the audio file is not the system pre-stored audio file, the spectrum analysis can be performed on the audio file to obtain the spectrum of the audio file, and the light effect control instructions corresponding to the spectrum can be determined in accordance with the spectrum of the audio file, thus greatly expanding an application range for obtaining the corresponding light effects by using the light strips 2.

Optionally, in at least one embodiment, when the audio file is a conventional audio file and not a system pre-stored audio file and there are no light effect control instructions matching the conventional audio file pre-stored in the system, determining the light effect control instructions corresponding to the spectrum in accordance with the spectrum of the audio file, includes: generating light effect control instructions corresponding to the spectrum of the audio file according to the spectrum of the audio file, in accordance with an audio-light effect conversion algorithm.

The audio-light effect conversion algorithm is one of conventional audio-light effect conversion algorithms.

The conventional audio file can be one or more of ringtone files, music files, audio files, videos files containing audio, an instant voice, a voice in an instant video. The ringtone file may be, but is not limited to, a telephone ringtone file, an SMS ringtone file, an alarm clock ringtone file, and other reminder ringtones, etc. The music file may be a music file downloaded locally from the internet, and may also be a music file obtained from the internet by a music application. The audio file is a file containing audio and/or voice, for example, a voice file in a live chat application, etc. The video file is a video file containing audio, for example, various types of video files, such as a short video on the web (e.g., a short video in an application such as Shake, Racer, Watermelon Video, etc.), a short video in a live chat application, a movie file, a TV series file, etc. The voice file is a piece of voice. The instant voice includes an audio file generated in a scenario such as being on a phone call or being in a voice chat. The voice in an instant video recording includes an audio file generated in a scenario such as live streaming or being in a video chat, for example, an audio file generated in real time during a live stream or video chat. The above is not a limitation, but rather an example.

Thus, the above-mentioned types of conventional audio files can be divided into four main types, namely ringtone files, music files, audio/video files, and instant voice/video call files.

The lighting manner can be a combination of a lighting area, a lighting colour, and a lighting frequency.

Optionally, in one embodiment, obtaining light effect control instructions corresponding to the audio file based on the audio file, includes: determining a category of usage environment of the audio file; obtaining light effect control instructions corresponding to the category of the usage environment of the audio file based on the difference of the usage environment of the audio file.

Therefore, one audio file is corresponded to different light effects in different usage environment.

Optionally, in one embodiment, the light strips 2 include at least two light strips 2 located on different zones of the back surface 11 of the main body 1. When the lighting manner at least includes the lighting area, controlling the light strips 2 to light up in the lighting manner, includes: determining a type of the audio file; controlling the light strips located in different areas to work, and presenting different light effects according to the type of the audio file; or controlling the light strips located in at least two different areas to work, and presenting different light effects according to the type of the audio file.

Optionally, in one embodiment, the method further includes: determining whether a transparent area of the transparent back cover 3 is shaded, and/or the back surface 11 of the electronic device 100 is facing upwards; controlling the light strips 2 to light up in accordance with the lighting manner in response to the light effect control instructions, so as to create a light effect consistent with the rhythm of the audio file, includes: controlling the light strips 2 to light up in accordance with the lighting manner, in response to the light effect control instructions, to create a lighting effect consistent with the rhythm of the audio file when the transparent area of the transparent back cover 3 is determined to be not shaded, and/or the back surface 11 of the electronic device 100 is determined to be facing upwards.

Thereby, only when the transparent area of the transparent back cover 3 is not shaded, and/or the back surface 11 of the electronic device 100 is facing upwards, the light strips 2 produces the light effects. Of course, when the transparent area of the transparent back cover 3 is shaded and/or the back surface 11 of the electronic device 100 is facing downwards, the light strips 2 will not turn on and no light effect will be produced, thus avoiding excessive power consumption.

Optionally, in one embodiment, before controlling the light strips 2 to light up in response to the light effect control instructions, the method further comprises: determining whether a light effect enabled instruction is obtained before playing the audio file or during playing the audio file; controlling the light strips 2 to light up in response to the light effect control instructions only when the light effect enabled instruction is obtained.

It should be understood that the light effect enabled instruction may be, but are not limited to, voice instructions, manually entered control instructions, a flip operation by the user to flip the electronic device 100, etc. For example, the user's voice says: please turn on the light effect, or, for example, during playing an audio file, the user flips the electronic device 100, and when the gyroscope of the electronic device 100 detects the flip angle of the electronic device 100 to be greater than a preset angle threshold, the light effect enabled instruction is generated.

Thereby, if each audio file is played with a corresponding light effect, it will greatly increase the power consumption of the electronic device 100, resulting in a shortening of the endurance of the electronic device 100 and affecting the user experience. Therefore, in practical application, the light strips 2 will only be lit up in response to the light effect control instructions when light effect enabled instruction is received, so as to reduce unnecessary lighting and power consumption, which not only meets the user's demand for light effects, but also saves electricity.

Optionally, in one embodiment, after controlling the light strips 2 to light up in accordance with the lighting manner of the light effect control instructions, the method further includes: determining whether a light effect closed instruction is obtained; controlling the strips 2 to turn off the light effect when the light effect closed instruction is received.

It should be understood that the light effect closed instruction may be, but is not limited to, voice instructions, manually entered control instructions, a flip operation by the user to flip the electronic device 100, etc. For example, the user's voice says: please turn off the light effect, or, for example, during playing an audio file, the user flips the electronic device 100 again and when the gyroscope of the electronic device 100 detects the flip angle of the electronic device 100 to be greater than the preset angle threshold, the light effect closed instruction is generated.

The technical solutions of the subject matter of the invention and the corresponding details have been described above, and it will be understood that the above descriptions are only some embodiments of the technical solutions of the subject matter of the invention, and that some of the details may be omitted in their specific implementation.

Furthermore, in some of the above embodiments of the invention, a number of embodiments are possible in combination, and the various combinations will not be enumerated for reasons of space. The person skilled in the art is free to combine the above embodiments according to the needs in order to obtain a better application experience.

From the above, it can be seen that this application has the above-mentioned excellent features, so that it can be used in a way that is not available in the previous technology and has practicality, becoming a product of great practical value.

Any modification, equivalent substitution or improvement made within the ideas and principles of this application shall be included in the scope of protection of this application.

What is claimed is:

1. A method of converting audio to light effect, applied to an electronic device, the electronic device comprising a main body, light strips located on a back surface of the main body, a transparent back cover covering the back surface of the main body having the light strips; and an audio playing unit, wherein the method comprises:
   obtaining an audio file in real time;
   obtaining light effect control instructions corresponding to the audio file based on the audio file; the light effect control instructions comprises a plurality of control instructions which control the light strips to be lit up in a lighting manner matching playback parameters of the audio file; the lighting manner comprising one or more of a lighting area, a lighting colour, a lighting frequency, a lighting duration, and a number of light flashes;
   creating a light effect consistent with the playback parameters of the audio file by controlling the audio playing unit to play the audio file, and
   synchronously controlling the light strips to light up in accordance with the lighting manner in response to the light effect control instructions.

2. The method of converting audio to light effect according to claim 1, wherein the audio file is a system pre-stored audio file; the electronic device further comprises pre-stored light effect control instructions, corresponding to the system pre-stored audio file; the step of obtaining light effect control instructions corresponding to the audio file based on the audio file comprises: obtaining light effect control instructions corresponding to the audio file based on the audio file from the electronic device.

3. The method of converting audio to light effect according to claim 1, wherein the audio file is a conventional audio file and not a system pre-stored audio file and there are no light effect control instructions corresponding to the conventional audio file pre-stored in the electronic device; the step of obtaining light effect control instructions corresponding to the audio file based on the audio file comprises:
   performing spectrum analysis on the audio file to obtain a spectrum of the audio file; and
   determining the light effect control instructions corresponding to the spectrum in accordance with the spectrum of the audio file.

4. The method of converting audio to light effect according to claim 3, wherein the step of determining the light effect control instructions corresponding to the spectrum in accordance with the spectrum of the audio file comprises:
   generating light effect control instructions corresponding to the spectrum of the audio file according to the spectrum of the audio file, in accordance with an audio-light effect conversion algorithm.

5. The method of converting audio to light effect according to claim 3, wherein the audio file is one or more of a ringtone file, a music file, an audio file, a video file containing audio, an instant voice, and a voice in an instant video.

6. The method of converting audio to light effect according to claim 5, wherein the light strips comprise at least two light strips located on different zones of the back surface of the main body; when the lighting manner includes at least the lighting area, the step of controlling the light strips to light up in the lighting manner, comprises:
   determining a type of the audio file;
   controlling the light strips located in different areas to work, and presenting different light effects according to the type of the audio file; or controlling the light strips located in at least two different areas to work, and presenting different light effects according to the type of the audio file.

7. The method of converting audio to light effect according to claim 1, wherein the method further comprises:
   determining whether a transparent area of the transparent back cover is shaded, and/or the back surface of the electronic device is facing upwards;
   the step of controlling the light strips to light up in accordance with the lighting manner in response to the light effect control instructions, comprising:
      controlling the light strips to light up in accordance with the lighting manner, in response to the light effect control instructions when the transparent area of the transparent back cover is determined to be not shaded, and/or the back surface of the electronic device is facing upwards.

8. The method of converting audio to light effect according to claim 1, wherein the method further comprises:
   determining a category of usage environment of the audio file;
   obtaining light effect control instructions corresponding to the category of the usage environment of the audio file based on a difference of the usage environment of the audio file.

9. The method of converting audio to light effect according to claim 1, wherein the method further comprises:
   determining whether a light effect enabled instruction is obtained before playing the audio file or during playing the audio file;
   controlling the light strips to light up in response to the light effect control instructions when the light effect enabled instruction is obtained.

10. The method of converting audio to light effect according to claim 1, wherein the method further comprises:
    determining whether a light effect closed instruction is obtained;
    controlling the strips to turn off the light effect when the light effect closed instruction is received.

11. An electronic device, wherein the electronic device comprises a main body; light strips located on a back surface of the main body; a transparent back cover overall covering the back surface of the main body having the light strips; an audio playing unit; a processor; and a memory, wherein the memory stores computer program, and the processor runs the computer program to execute the method of converting audio to light effect:
    obtaining an audio file in real time;
    obtaining light effect control instructions corresponding to the audio file based on the audio file; the light effect control instructions comprises a plurality of control instructions which control the light strips to be lit up in a lighting manner matching playback parameters of the audio file; the lighting manner comprising one or more of a lighting area, a lighting colour, a lighting frequency, a lighting duration, and a number of light flashes;
    creating a light effect consistent with the playback parameters of the audio file by controlling the audio playing unit to play the audio file, and synchronously controlling the light strips to light up in accordance with the lighting manner in response to the light effect control instructions.

12. The electronic device according to claim 11, wherein the audio file is a system pre-stored audio file; a system has pre-stored light effect control instructions, the pre-stored light effect control instructions match the system pre-stored audio file; the processor obtaining light effect control instructions corresponding to the audio file based on the audio file, comprises: obtaining light effect control instructions corresponding to the audio file based on the audio file from the system.

13. The electronic device according to claim 11, wherein the audio file is a conventional audio file and not a system pre-stored audio file and there are no light effect control instructions matching the conventional audio file pre-stored in a system; the processor obtaining light effect control instructions corresponding to the audio file based on the audio file, comprises:
- performing spectrum analysis on the audio file to obtain a spectrum of the audio file; and
- determining the light effect control instructions corresponding to the spectrum in accordance with the spectrum of the audio file.

14. The electronic device according to claim 13, wherein the processor determining the light effect control instructions corresponding to the spectrum in accordance with the spectrum of the audio file, comprises:
- generating light effect control instructions corresponding to the spectrum of the audio file according to the spectrum of the audio file, in accordance with an audio-light effect conversion algorithm.

15. The electronic device according to claim 13, wherein the audio file is one or more of a ringtone file, a music file, an audio file, a video file containing audio, an instant voice, a voice in an instant video.

16. The electronic device according to claim 15, wherein the light strips comprise at least two light strips located on different zones of the back surface of the main body; when the lighting manner at least includes the lighting area, the processor controlling the light strips to light up in the lighting manner, comprises:
- determining a type of the audio file;
- controlling the light strips located in different areas to work, and presenting different light effects according to the type of the audio file; or controlling the light strips located in at least two different areas to work and presenting different light effects according to the type of the audio file.

17. The electronic device according to claim 11, wherein the processor is further configured to determine whether a transparent area of the transparent back cover is shaded, and/or the back surface of the electronic device is facing upwards; the processor controlling the light strips to light up in accordance with the lighting manner in response to the light effect control instructions, comprising:
- controlling the light strips to light up in accordance with the lighting manner, in response to the light effect control instructions when the transparent area of the transparent back cover is determined to be not shaded, and/or the back surface of the electronic device is facing upwards.

18. The electronic device according to claim 11, wherein the processor is further configured to:
- determine a category of usage environment of the audio file;
- obtain light effect control instructions corresponding to the category of the usage environment of the audio file based on a difference of the usage environment of the audio file.

19. The electronic device according to claim 11, wherein the processor is further configured to:
- determine whether a light effect enabled instruction is obtained before playing the audio file or during playing the audio file;
- control the light strips to light up in response to the light effect control instructions only when the light effect enabled instruction is obtained.

20. The electronic device according to claim 11, wherein the processor is further configured to:
- determine whether a light effect closed instruction is obtained;
- control the strips to turn off the light effect when the light effect closed instruction is received.

* * * * *